*Barton & Roberts.*
*Manure and Hay Fork.*
Nº 18,670.          Patented Nov. 24, 1857.
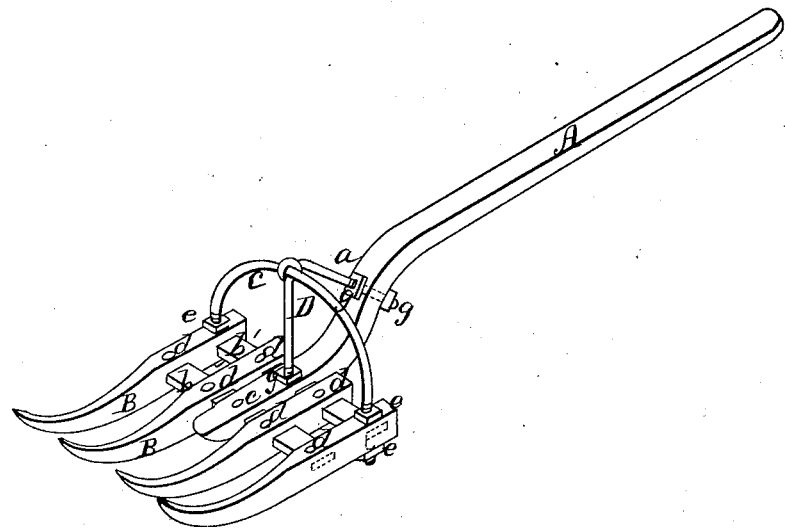

UNITED STATES PATENT OFFICE.

G. L. BARTON AND A. E. ROBERTS, OF ALBANY, NEW YORK.

IMPROVEMENT IN HAY AND MANURE FORKS.

Specification forming part of Letters Patent No. 18,670, dated November 24, 1857.

*To all whom it may concern:*

Be it known that we, G. L. BARTON and A. E. ROBERTS, both of the city and county of Albany, in the State of New York, have invented a new and Improved Manure and Hay Fork; and we do hereby declare that the following is a full, clear, and exact description of the same, reference being had to the accompanying drawing, making a part of this specification, the said drawing being a perspective view of our improvement.

Our invention consists in the peculiar construction of the implement, as will be herein after fully shown and described, whereby the principal parts of the fork may be constructed of wood, and a light, durable, and cheap implement obtained.

To enable those skilled in the art to fully understand and construct our invention, we will proceed to describe it.

A represents the handle of the implement, which is constructed of ash or other suitable wood. The end of the handle adjoining the tines is of curved or bent form, as shown at $a$. Through this end or part of the handle two cross-bars, $b\ b'$, pass. These bars are also constructed of a suitable hard wood, and they pass through mortises made in the handle and project at equal distances each side of it, the outermost bar, $b$, being secured in the handle by a screw or pin, $c$.

B B B B represent the tines of the fork. These tines are also constructed of wood of a suitable kind, and have mortises made through them at their inner ends to allow the bars $b\ b'$ to pass through them. The tines are secured to the bars $b\ b'$, at suitable distances apart, by screws $d$. The tines are of curved form, not differing essentially from the form of the ordinary forks.

C represents a round metal rod, which is bent in semicircular form and has a screw-thread formed on each end. The ends of this bow pass through the inner parts of the two outermost tines and through the ends of the innermost bar, $b'$, the ends of the rod having jam-nuts $e$ upon them, by which they are secured to said tines and bar.

D represents a metal rod, which is bent around the rod C at its center, as shown at $f$. The rod D is bent in V form, as shown clearly in the drawing, and its ends have screw-threads formed on them. One end of the rod D passes through the handle A at the bend $a$, and the other end passes through the handle and innermost bar, $b'$, the ends of said rods having jam-nuts $g$ on them, by which the rod is permanently secured.

The two rods C D serve as braces and render the fork perfectly strong and durable.

We do not claim the broad idea of using curved braces or bows in connection with the tines and handles of forks, for we are well aware that they are old; but to the best of our knowledge and belief there has never been a fork made in which the bow was placed upright, as in our improvement, and supported and held steady in that position by a rod, D, extending from the center of the tines to the center of the arch of the bow and thence to the handle. The peculiar arrangement and position of our bow C is such as to insure the greatest amount of strength with the least weight of material. It forms a complete arch. If the bow were bent over and stood obliquely in respect to the tines, as in other forks, it would not possess such great advantages, for effective strength of the arch would be thereby destroyed. Again, the bow C, by standing in an upright position and being firmly held there by the rod D, forms an effective guard, which prevents the hay from falling back upon the person of the operator when engaged in throwing up the material upon a high load. The rod D also serves to hold the bow steady and prevent its fastenings from straining the wood and becoming loose. In other forks the bows are apt to work loose and destroy the wooden portions after short usage. The employment of double cross-bars $b\ b'$ prevents any one of the tines from bending down out of level with the others.

Having thus described our improvement, we claim and desire to secure by Letters Patent as an improved article of manufacture—

A hay-fork provided with an upright bow, C, said bow being firmly held in its position by means of the rod D, which rod extends from the center of the tines to the center of the bow and thence to the handle of the fork, and the tines B, provided with double cross-bars $b\ b'$, all as hereinafter set forth.

G. L. BARTON.
A. E. ROBERTS.

Witnesses:
JAMES W. VAN ALSTYNE,
JOHN R. VAN ALSTYNE.